США009348758B2

(12) United States Patent
Pignatelli

(10) Patent No.: US 9,348,758 B2
(45) Date of Patent: May 24, 2016

(54) VIRTUAL ADDRESSING WITH MULTIPLE LOOKUP TABLES AND RAID STRIPES

(71) Applicant: SK hynix memory solutions inc., San Jose, CA (US)

(72) Inventor: David J. Pignatelli, Saratoga, CA (US)

(73) Assignee: SK Hynix memory solutions inc., San Jose, CA (US)

( * ) Notice: Subject to any disclaimer, the term of this patent is extended or adjusted under 35 U.S.C. 154(b) by 360 days.

(21) Appl. No.: 13/837,267

(22) Filed: Mar. 15, 2013

(65) Prior Publication Data

US 2014/0089630 A1    Mar. 27, 2014

Related U.S. Application Data

(60) Provisional application No. 61/704,662, filed on Sep. 24, 2012.

(51) Int. Cl.
| | |
|---|---|
| *G06F 12/00* | (2006.01) |
| *G06F 12/10* | (2016.01) |
| *G06F 12/02* | (2006.01) |
| *G06F 3/06* | (2006.01) |

(52) U.S. Cl.
CPC .......... *G06F 12/1009* (2013.01); *G06F 3/0628* (2013.01); *G06F 3/0662* (2013.01); *G06F 3/0689* (2013.01); *G06F 12/0246* (2013.01); *G06F 12/0292* (2013.01); *G06F 12/109* (2013.01); *G06F 12/1036* (2013.01)

(58) Field of Classification Search
CPC ... G06F 3/0628; G06F 3/0662; G06F 3/0689; G06F 12/0246; G06F 12/0292; G06F 12/1009; G06F 12/1036; G06F 12/109

USPC ............... 711/206, 209, 221; 710/9, 26, 120
See application file for complete search history.

(56) References Cited

U.S. PATENT DOCUMENTS

| | | | |
|---|---|---|---|
| 7,418,550 B2 | 8/2008 | Hetrick et al. | |
| 7,774,575 B2 | 8/2010 | Seto et al. | |
| 2007/0260845 A1 | 11/2007 | Kita | |
| 2009/0006716 A1 | 1/2009 | Lubbers et al. | |
| 2009/0150599 A1* | 6/2009 | Bennett | G06F 11/1441 711/103 |
| 2010/0191779 A1* | 7/2010 | Hinrichs | 707/822 |
| 2010/0199036 A1* | 8/2010 | Siewert | G06F 3/0613 711/112 |
| 2012/0166712 A1 | 6/2012 | Lary | |
| 2014/0189212 A1* | 7/2014 | Slaight | G06F 12/0866 711/103 |

OTHER PUBLICATIONS

International Search Report for International Application No. PCT/US2013/061293, dated Jan. 2, 2014, 2 pages.

* cited by examiner

*Primary Examiner* — Reba I Elmore
(74) *Attorney, Agent, or Firm* — IP & T Group LLP

(57) ABSTRACT

A method of relating the user logical block address (LBA) of a page of user data to the physical block address (PBA) where the data is stored in a RAID architecture reduces to size of the tables by constraining the location to which data of a plurality of LBAs may be written. Chunks of data from a plurality of LBAs may be stored in a common page of memory and the common memory pages is described by a virtual block address (VBA) referencing the PBA, and each of the LBAs uses the same VBA to read the data.

7 Claims, 1 Drawing Sheet

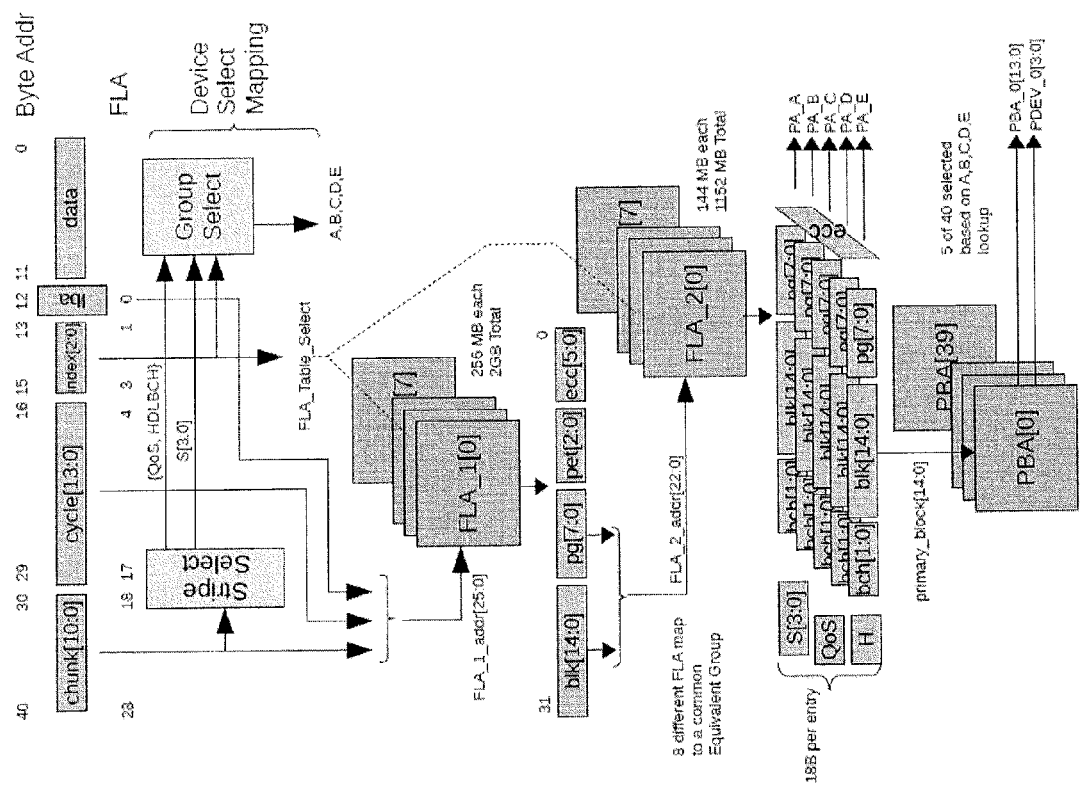

VIRTUAL ADDRESSING WITH MULTIPLE LOOKUP TABLES AND RAID STRIPES

This application claims the benefit of U.S. 61/704,662, filed on Sep. 24, 2012, which is incorporated herein by reference.

TECHNICAL FIELD

This application may relate to the storage of digital data in a memory system.

BACKGROUND

FLASH memory systems may use a Logical to Physical (L2P) translation function to address the FLASH memory locations used to store the data. As FLASH memory systems density increases and total memory size increases, the size of memory used for the translation may become unwieldy and uneconomic as to cost and system resources. Typically the L2P table is stored in a volatile memory, such as RAM, due to access time considerations.

SUMMARY

A multistep address translation where a virtual address is described so as to link related address components for various data accesses can be used to reduce the table storage requirements when compared with a direct conversion of L2P.

Using the virtual address also reduces memory access times by avoiding a large direct look up table. This reduces the physical memory capacity, cost, and power requirements of such a memory where, when designing large capacity memory systems, the physical area and power dissipation of functional support components needs to be decreased to leave such resources for the FLASH memory components themselves.

A method of managing a redundant array of inexpensive/independent disks (RAID) memory system is disclosed where a processor is configured for: maintaining a first lookup table representing a mapping of a user logical block address (LBA) to a virtual block address (VBA); mapping the VBA to a RAID stripe wherein a chunk of data of the LBA is stored on a memory device of a plurality of memory devices; maintaining a second lookup table representing a mapping of the VBA to a physical block address (PBA) of a memory device of a plurality of memory devices; selecting chunks from a plurality of LBAs to form a page of data having a VBA value; and writing the data to the plurality of memory devices in a RAID stripe. Each LBA of the plurality of LBAs forming the page of data map to the VBA value of the page.

Further, reading data corresponding to a user LBA is performed by performing a lookup of the corresponding VBA address in the first lookup table; performing a lookup of the correspondence of the VBA and the PBA in the second lookup table; and reading the data from the PBA. The VBA may have metadata mapping the chunk location to one of the LBAs In an aspect, the controller may manage the operations of the memory devices used to store the data such that operations are scheduled so as to provide erase hiding.

A computer program product is disclosed, stored on a non-volatile computer readable medium, comprising instructions for configuring a processor to: maintain a first lookup table representing a mapping of a user LBA to a virtual block (VBA) address; map the VBA to a RAID stripe wherein a chunk of data of the LBA is stored on a memory device of a plurality of memory devices maintain a second lookup table representing a mapping of the VBA to a physical block address (PBA) of a memory device of a plurality of memory devices; select chunks from a plurality of LBAs to form a page of data having a VBA value; and write the data to the plurality of memory devices in a RAID stripe. Each LBA of the plurality of LBAs forming the page of data map to the VBA value of the page.

In an aspect, the processor may be operated to: read the data corresponding to a user LBA by performing a lookup of the corresponding VBA address in the first lookup table; perform a lookup of the correspondence of the VBA and the PBA in the second lookup table; and read the data from the PBA.

BRIEF DESCRIPTION OF THE DRAWINGS

FIG. 1 is a chart showing the relationship of various tables in a virtual memory look up method.

DESCRIPTION

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

When describing a particular example, the example may include a particular feature, structure, or characteristic, but every example may not necessarily include the particular feature, structure or characteristic. This should not be taken as a suggestion or implication that the features, structure or characteristics of two or more examples, or aspects of the examples, should not or could not be combined, except when such a combination is explicitly excluded. When a particular aspect, feature, structure, or characteristic is described in connection with an example, a person skilled in the art may give effect to such feature, structure or characteristic in connection with other examples, whether or not explicitly set forth herein.

It will be appreciated that the methods described and the apparatus shown in the figures may be configured or embodied in machine-executable instructions; e.g., software, hardware, or in a combination of both. The instructions can be used to cause a general-purpose computer, a special-purpose processor, such as a digital signal processing (DSP) or array processor, an application specific integrated circuit (ASIC), a field programmable gate array (FPGA) or the like, that is programmed with the instructions to perform the operations described. Alternatively, the operations might be performed by specific hardware components that contain hardwired logic or firmware instructions for performing the operations described, or may be configured to so, or by any combination of programmed computer components and custom hardware components, which may include analog circuits.

The methods may be provided, at least in part, as a computer program product that may include a machine-readable medium having stored thereon instructions which may be used to program a computer (or other electronic devices), or a FPGA, or the like, to perform the methods. For the purposes of this specification, the terms "machine-readable medium" shall be taken to include any medium that is capable of storing or encoding a sequence of instructions or data for execution by a computing machine or special-purpose hardware and that cause the machine or special purpose hardware to perform any one of the methodologies or functions of the present invention. The term "machine-readable medium" shall accordingly be taken include, but not be limited to, solid-state memories, optical and magnetic disks, magnetic memories, optical memories, or other functional equivalents. The software program product may be stored or distributed on one medium and transferred or re-stored on another medium for use.

For example, but not by way of limitation, a machine readable medium may include: read-only memory (ROM); random access memory (RAM) of all types (e.g., S-RAM, D-RAM); programmable read only memory (PROM); electronically alterable read only memory (EPROM); magnetic random access memory; magnetic disk storage media; FLASH; or, other memory type that is known or will be developed, and having broadly the same functional characteristics.

Furthermore, it is common in the art to speak of software, in one form or another (e.g., program, procedure, process, application, module, algorithm or logic), as taking an action or causing a result. Such expressions are merely a convenient way of saying that execution of the software by a computer or equivalent device causes the processor of the computer or the equivalent device to perform an action or a produce a result, as is well known by persons skilled in the art.

A memory system may be comprised of a number of functional elements, and terminology may be introduced here so as to assist the reader in better understanding the concepts disclosed herein. However, the use of a specific name with respect to an aspect of the system is not intended to express a limitation on the functions to be performed by that named aspect of the system. Except as specifically mentioned herein, the allocation of the functions to specific hardware or software aspects of the system is intended for convenience in discussion, as a person of skill in the art will appreciate that the actual physical aspects and computational aspects of a system may be arranged in a variety of equivalent ways. In particular, as the progress in the electronic technologies that may be useable for such a system evolves, the sizes of individual components may decrease to the extent that more functions are performed in a particular hardware element of a system, or that the scale size of the system may be increased so as to encompass a plurality of system modules, so as to take advantage of the scalability of the system concept. All of these evolutions are intended to be encompassed by the recitations in the claims.

The memory system may comprise, for example, a RAID controller, a data switch fabric, an ordering plane fabric, memory controllers and memory modules. In a large memory system, where reliable storage of data is desired, there is always a concern that the failure of an element of hardware, an unidentified software defect or a power failure, may lead to the uncorrectable loss of data. As a consequence, data storage systems may provide for a periodic back-up of the data to a disk or tape system for archival storage. While this may permit reconstruction of data lost to a memory system failure, the response time is long as compared with the expected response time of the memory system and such "restorals" are desired to be avoided.

Consequently memory systems may be designed with both hardware and software redundancy. One of the common techniques for storing data in a redundant fashion in a memory system is RAID. The concept of RAID (Redundant Arrays of Independent (or Inexpensive) Disks) dates back at least as far as a paper written by David Patterson, Garth Gibson and Randy H. Katz in 1988. RAID allows disks memory systems to be arranged so as to protect against the loss the data that they contain by adding redundancy. In a properly configured RAID architecture, the loss of any single disk (or in more modern systems, a FLASH die or module), for example, will not interfere with the ability to access or reconstruct the stored data. The Mean Time Between Failure (MTBF) of the storage array without RAID will be equal to the MTBF of an individual storage module, divided by the number of storage modules in the array, since the loss of any storage module results in a loss of data When a location of data in FLASH memory is changed, there is usually a modification to an address mapping table that translates the Flash Logical Address (FLA) to the Flash Physical Address (FPA). This mapping may be part of the function termed the Flash Translation Layer (FTL). As the FLASH memory density increases and larger capacity memory systems are designed, the amount of mapping information that may be needed to access the data stored in the memory becomes larger and larger for a physical size device.

Since specific storage locations (e.g., die, blocks, pages) in a FLASH memory system may go out of service due to hardware failure, wear out, or the like, and each of the storage locations may be considered in this regard to be independent of the others, reducing the amount of mapping information by using the same physical address in multiple devices (mapped from the same logical address) may be problematic, as a plurality of such locations located on different devices would have to be taken out of service in the case of the failure of one storage location.

Each FLASH Logical Address (FLA) (representing, for example a 4 KB "page" of data) needs to be mapped to multiple physical device addresses (PDA) to support a RAID data storage approach. If each FLA is independently mapped, a large data table results; 2 TB of data stored in 4 KB sized pages would result in 512 Million entries in the L2P table. Each entry for a RAID3 (4+1) configuration, would supply the physical address for five different resource pools; where each pool may consist of multiple FLASH packages, each of the pools having an independent block and page specification. Table 1 illustrates the size of this table if it were to be directly mapped.

TABLE 1

| Direct Fully Independent Physical Address Mapping Table Size | |
|---|---|
| Number of Entries (2TB, 1TB, 500 GB user capacity) | 512M, 256M, 128M |
| Per Entry Device Select Code | 4 bits × 5 |
| Per Entry Block Select Code | 15 bits × 5 |
| Per Entry Page Select Code | 8 bits × 5 |
| Total Table Size (RAID-3 4 + 1) no ECC | 9.0 GB, 4.5 GB, 2.3 GB |

However, the RAID striping scheme may be constrained so as to remove some flexibility as to the mapping to devices, which may reduce the table sizes. In an example where a FLASH page contains 8 logical entries, the number of mapping bits can be reduced from 29 to 26. Further, indirect lookup is used, one table entry associated with all 5 of the physical addresses may be referenced by 8 different FLA.

For example, in the case where a RAID storage pattern comprising 4 independent devices for storing data and one independent device storing data where each device is configured to store pages of data comprising 8 KB of data and having a block size of 128 pages, a 4 KB block of user data (user LBA) would be striped across the RAID devices so that 1 KB of user data would be stored in one of the 8 KB pages on each of the devices in the RAID group. But, each of the pages of the devices is capable of storing 8 KB of data, and since in a NAND FLASH memory, for example, all of the data intended to be stored in a memory page needs to be stored prior to proceeding to another memory page. So, storing only one 1 KB chunk of data of the user LBA 4 KB page in the memory page would waste ⅞ths of the memory page.

So, prior to writing data to a FLASH memory page, 1 KB of data from each of the user LBAs is selected so that 8 1 KB chunks of data may be stored in a single memory page, where each of the 1 KB chunks is selected from a different user LBA.

But, retrieval of a particular user LBA data requires addressing the 8 KB page in each of the separate memory devices, and selecting the appropriate chunk. It will be appreciated that the amount of metadata needed to perform the retrieval operation is considerable, as is its maintenance. This metadata may be compressed as each of the 8 user LBAs whose 1 KB chunk was selected for storage in the 8 KB page ultimately references the same physical block address (PBA) referencing page in the memory. The 8 KB page is the smallest referenced page size in this example. The entire page may be read out, or a specific chunk selected from the memory read buffer, depending on the specific approach taken. In any event, the 8 different user LBAs reference a single PBA. Now, turning to a detailed example, the memory and timing efficiency of this approach will be easily understood by a person of skill in the art.

The FLASH Logical Address (FLA) may be translated in two steps; first, the user address (LBA) may be translated to a virtual address using the FLA_1 table; and, second, the virtual address may be translated to the physical addresses (PBA) using FLA_2 table. There are 8 distinct first level translations that resolve to (point to) a common second virtual address. This leads to the more compact structure shown in Table 2, Table 3, and Table 4.

TABLE 2

Reduced Direct Map RAID Cycle Constrained Mapping Table Size

| | |
|---|---|
| FLA_1 Number of Entries (2TB, 1TB, 500 GB user capacity) | 64M, 32M, 16M Repeated in 8 groups (512M entries total) |
| Per Entry Block Select Code | 15 bits |
| Per Entry Page Select Code | 8 bits |
| Per Entry Data Location Code | 3 bits |
| Total FLA_1 Table Size with ECC | 2 GB, 1 GB, 0.5 GB |

The contents of the FLA_1 table provide the virtual address in the form of a common virtual block and a common virtual page. The value (the 21 bit value shown here) is the index of the FLA_2 entry.

TABLE 3

Second Level Indirect Mapping Table - Equivalent Group

| | |
|---|---|
| FLA_2 Number of Entries | 8M Repeated in 8 groups (64M entries total) |
| Per Entry Primary Block Select Code | 15 bits × 5 |
| Per Entry Page Select Code | 8 bits × 5 |
| Total Table Size with ECC | \1152 MB |

The contents of the FLA_2 table comprise the physical location information (PBA) used to access data from the common FLASH address shared by the 8 user LBAs. Note that by using another level of indirection between the FLA_2 and the final physical mapping to the PBA, it is possible to map spare devices when die failures occur. This third translation, using the Physical Block Address (PBA) Table, would provide the selection code and remapped block address.

TABLE 4

Third Level Block Indirect Mapping Table - Physical Block Address

| | |
|---|---|
| PBA [k] Number of Entries k = {1, 2, 3, . . . 40} | 32K Repeated in 40 resources (1.25M entries total) |
| Per Entry Device Select Code | 4 bits (typically only 8 DIE are accessible, the extra bit allows for configurable reassignment to a different device) |
| Per Entry Block Select Code | 13 bits (typically 4K + d blocks per DIE) |
| Total Table Size | 3.75 MB |

As data may be stored in FLASH as multiple distinct user (LBA) blocks (in data terms, a page). Each distinct user (LBA) block (page) may map to a virtual FLASH Address (Block and Page; that is, Block of the FLASH memory on a chip and a memory page in that Block). A common virtual FLASH address may resolve to a single metadata element containing the necessary physical FLASH access parameters {phy, device, block, page, etc}.

This is illustrated in FIG. 1, where the input address may first be segmented into Logical Raid Groups (LRG); and, then within each LRG, the remaining address bits form a search key for the Logical to Physical (L2P) address lookup. N different user logical addresses map into a same LRG all reference this common virtual address. Using the value stored at the Virtual entry, the Physical entry that contains a large amount of addressing information is recovered.

In an example system having 2 TB of storage, a direct mapped lookup capable of addressing any 4 kB user (LBA) block may require over 9 GB of storage. Using the techniques described herein, the database mapping storage requirements can be reduced to about 3 GB.

If directly mapped to a 4 KB native page size, a L2P (logical-to-physical) mapping table requires ($2^{40}$/$2^{12}=2^{28}$) 256 Million entries. For each entry, a specification of 5 physical addresses is needed (if there were 5 columns in the RAID group), resulting in a storage requirement of roughly 8 GB per TB of FLASH memory.

We have shown that the L2P space size requirements may be reduced by almost a factor of 3 by realizing that each page stores 8 chunks (sometimes called sectors, corresponding to the legacy disk terminology), and thus there are 8 different FLA values per group that share the same page physical address. This common address may be called the Equivalent Group Address. The Equivalent Group Address may comprise a Virtual Block (VB) and Virtual Page index. The VB represents a full physical block of storage. With a 2 MB user FLASH block size and 4 user RAID Columns, each Virtual Block may represent 8 MB of (user) storage space. Thus, for each TB of user storage, 128K Virtual Blocks may be required.

The number of VB in a RAID Group may be computed as the maximum number of VB required divided by the number of RAID Groups. Thus, there would be 128K/16=8K Virtual Blocks per Raid Group per TB. A Virtual Block free list for each RAID Group may be provided having 8192 elements. The list may be initialized when formatted using a linear sequence. The number of elements per list is determined following a BAD_BLOCK scan so that the number of VB matches the actual number of good blocks. Note that a mapping of RAID Group column to physical die can be made to initialize these free lists.

In an example, the FLA L2P table lookup may be performed in 3 steps. First, the Logical Raid Group is selected by the Raid Index bits (FLA[4:1]), thus breaking the initial 256 M entry space into sixteen, 16 M entry spaces; each entry space with its own lookup table. A lookup is performed in the 16 M entry table to find the Equivalent Group Address (Virtual Block and Virtual Page) within that Logical Raid Group. (Each Logical Raid group may be comprised of 8192 virtual blocks, each with 256 pages, so each lookup result is 21 bits). Finally, using a 2 M entry sub-table linked to the appropriate Logical Raid Group, the Logical Raid Group Virtual Block and Page are converted to 5 Physical {block, page} entries, remapping the page. This allows utilizing memory blocks that may have a singular bad page. If it is required that all pages of all blocks in use be "good", then this physical mapping need only specify the block (and in this case the Virtual Page is the desired page).

Each (FLA_1) Logical-to-Virtual Block Lookup Table may be described as: Depth=16 M entries; Content: Virtual Block[12:0], Virtual Page[7:0], chunk[2:0]. The total payload per entry is 24 Bits. An embedded ECC may be 4 B. Each table may therefore be 64 MB, and with 16 tables a total of 1 GB of space would be needed.

Each (FLA_2) Virtual to Physical Lookup Table (VPLT) may be described as: Depth=2M entries; Content: 5×{Physical Block [13:0], Physical Page[7:0]}, BCH_code[2:0] The total payload per entry is 117 bits. The VPLT can be packaged as five, 4 B codewords each providing 26 payload bits and 6 ECC check bits. Each table may therefore be 40 MB and with 16 tables a total of 640 MB would be needed.

Thus, the total storage for FLA L2P for 1 TB usable space would be 1.64 GB. (compared to 8 GB if the data were to be directly mapped)

In another aspect, the use of the system of virtual addressing effectively decouples the process of converting the logical addresses to physical addresses so that alternative address scrambling or dispersing algorithms are used. Differing algorithms or tables can be used to distribute the logical addresses to RAID groups, while the VPA to PBA mapping process may remain the same. This may permit the use of various mapping schemes, which may be orthogonal, to perform the LBA to VPA mapping. A result of using a plurality of schemas is that pathological access hot spots may be avoided.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention.

What is claimed is:

1. A method of managing a redundant array of inexpensive/independent disks (RAID) memory system, comprising:
configuring a processor for:
  maintaining a first lookup table representing a mapping of a user logical block address (LBA) to a virtual block address (VBA), wherein a plurality of LBAs map to a common VBA;
  mapping the VBA to a RAID stripe wherein a chunk of data of the LBA is stored on a memory device of a plurality of memory devices;
  maintaining a second lookup table representing a mapping of the VBA to a physical block address (PBA) of a memory device of a plurality of memory devices;
  selecting chunks from a plurality of LBAs to form a page of data having a VBA value; and
  writing the data to the plurality of memory devices in a RAID stripe;
  wherein each LBA of the plurality of LBAs forming the page of data map to the VBA value of the page.

2. The method of claim 1, further comprising:
  reading the data corresponding to a user LBA by performing a lookup of the corresponding VBA address in the first lookup table;
  performing a lookup of the correspondence of the VBA and the PBA in the second lookup table; and
  reading the data from the PBA.

3. The method of claim 1, wherein the VBA metadata includes a mapping of the chunk location to one of the plurality of LBAs referencing the second table.

4. The method of claim 1, wherein the first and the second lookup tables are maintained in volatile memory.

5. The method of claim 1, wherein:
  there is a third lookup table re-mapping the PBA address.

6. A computer program product, the computer program product being embodied in a non-transitory computer readable storage medium and comprising computer instructions for:
  maintaining a first lookup table representing a mapping of a user logical block address (LBA) to a virtual block address (VBA), wherein a plurality of LBAs map to a common VBA;
  mapping the VBA to a redundant array of inexpensive/independent disks (RAID) stripe wherein a chunk of data of the LBA is stored on a memory device of a plurality of memory devices
  maintaining a second lookup table representing a mapping of the VBA to a physical block address (PBA) of a memory device of a plurality of memory devices;
  selecting chunks from a plurality of LBAs to form a page of data having a VBA value; and
  writing the data to the plurality of memory devices in a RAID stripe;
  wherein each LBA of the plurality of LBAs forming the page of data map to the VBA value of the page.

7. The computer program product of claim 6, further comprising computer instructions for:
  operating the processor to:
  read the data corresponding to a user LBA by performing a lookup of the corresponding VBA address in the first lookup table;
  perform a lookup of the correspondence of the VBA and the PBA in the second lookup table; and
  read the data from the PBA.

* * * * *